April 19, 1966 N. MAROPIS 3,246,516
APPARATUS USING VIBRATORY ENERGY TO DETECT THE PRESENCE
OF SUBSTANCES
Filed May 21, 1963

INVENTOR.
NICHOLAS MAROPIS
BY

United States Patent Office 3,246,516
Patented Apr. 19, 1966

3,246,516
APPARATUS USING VIBRATORY ENERGY TO DETECT THE PRESENCE OF SUBSTANCES
Nicholas Maropis, West Chester, Pa., assignor, by mesne assignments, to the United States of America as represented by the United States Atomic Energy Commission
Filed May 21, 1963, Ser. No. 282,180
4 Claims. (Cl. 73—290)

This invention relates to a method and apparatus for determining the state of matter and/or physical properties of substances. More particularly, it relates to a method and apparatus utilizing vibratory energy for measuring the displacement between interfacial levels of stratified substances, such as liquid, foam, and gas, and also for determining the liquid content of foam.

The present invention is applicable to many situations, such as the brewing of beer, the making of chemicals, and the generation of steam by a boiling water nuclear reactor. In a pressure vessel of a boiling water nuclear reactor, for example, water circulates through a hot core, and a mixture of steam and water is produced which flows upwardly through a riser. Steam rises to the surface of the water and separates therefrom, and water flows over the top of the riser and is returned to the core. Maintaining a predetermined water level in the vessel is important; too high a level causes reduction in steam disengaging space and production of low quality steam, and too low a level affects water recirculation with increasing risk of excessive heat buildup in the core. Access and control are difficult, because of the closed-vessel heavy-walled construction, massive radiation shielding, and high pressure and high temperatures involved.

Various instrumentation techniques have been considered, but these have not proved to be entirely satisfactory for reasons such as cost, fragility, interpretation difficulty, and insufficient sensitivity.

It is a general object of this invention to provide a method and apparatus for solving such problems, which is accurate, convenient, effective, rugged, dependable, and reasonably economical.

Other objects will appear hereinafter.

This invention involves use of a vibratory probe suitably installed in the applicable area of the reactor or other vessel and, based on power transmission and characteristic variation thereof from the probe into the medium, the location, identification, and/or composition profiling of the various stratified substances present.

For the purpose of illustrating the invention, there is shown in the drawings forms which are presently preferred, it being understood, however, that this invention is not limited to the precise ararngements and instrumentalities shown.

Figures 1, 1A:
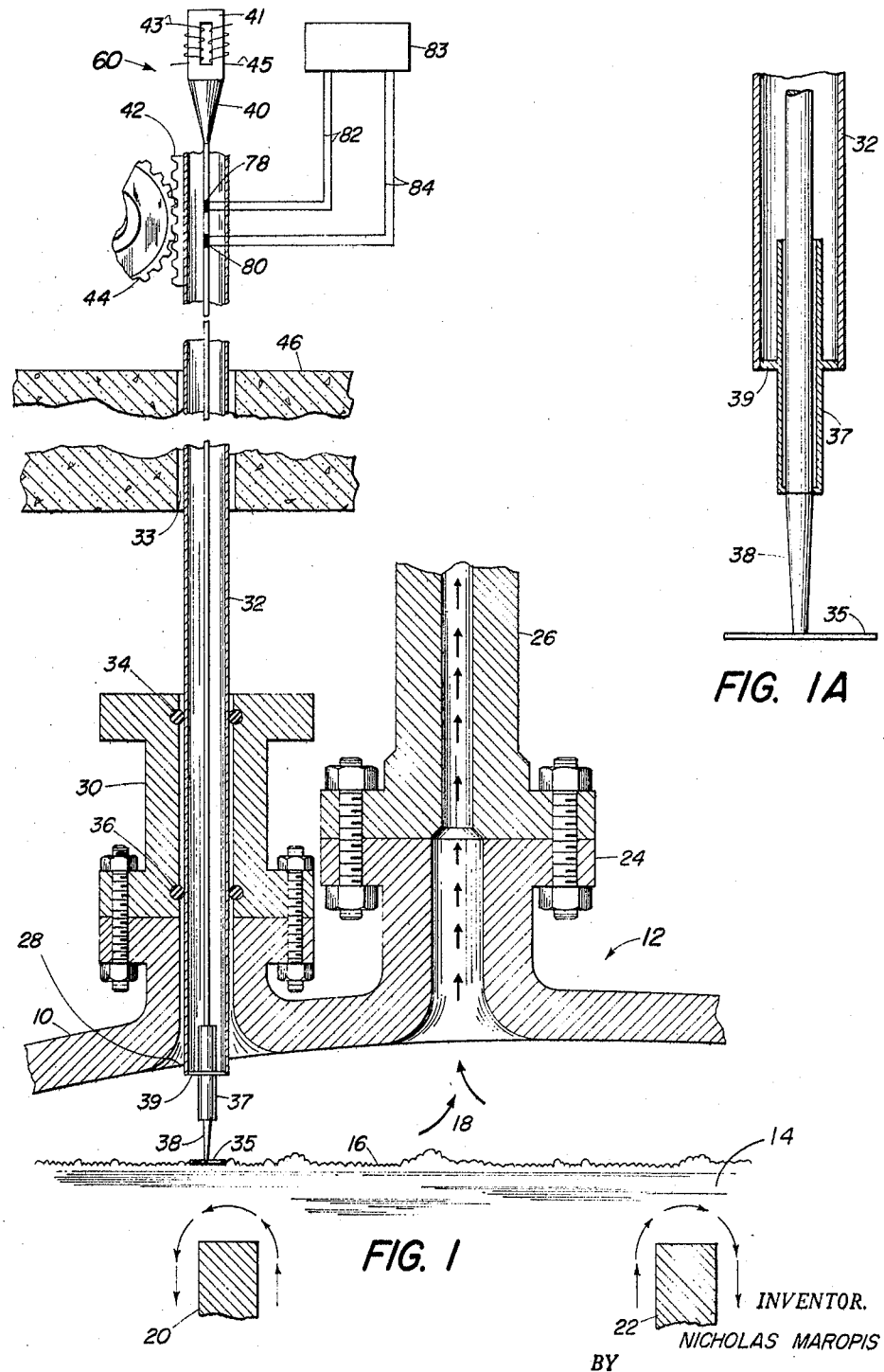
FIGURE 1 is a diagrammatic elevational view, with parts in section, of apparatus according to the invention installed in a boiling water nuclear reactor.
FIGURE 1A is an enlarged sectional view of a fragment of the apparatus illustrated in FIGURE 1.

In FIGURE 1, there is shown a fragment of wall structure 10 defining a pressure vessel 12 of a boiling water reactor. Within the reactor is a hot core (not shown) arranged in heat transfer relationship with circulating water 14 to produce a mixture of steam and water. A foam layer 16 forms on top of the surface of the water 14. Steam 18 rises from the surface of the water 14, through the foam layer 16, and is conducted to a heat exchanger. The steam 18 is conducted to the heat exchanger through an opening in wall 10 formed by a flange 24 and through a conduit 26 bolted to the flange 24. It is important that the level of the water 14, as indicated by the height of the interface between the water 14 and the foam layer 16, be maintained above the risers 20 and 22, so that the water 14 may flow over the top of the risers and be returned to the core.

The vessel 12 has a second opening 28 formed therein which is aligned with an exteriorly-mounted matching bushing 30 having an axial bore therethrough in line with an opening 33 in radiation shield 46. An elongated tubular housing 32 extends through the bushing 30 and the opening 28 into the vessel 12; it extends away from the vessel 12 and through an opening 33 in shield 46, and it is movable in vertical direction toward and away from the water 14 along a line normal to the surface thereof. Suitable seals 34 and 36 are interposed between the bushing 30 and the housing 32, to prevent the leakage of steam from the vessel 12 and yet permit vertical movement of the housing 32 relative to the bushing 30.

At the lower end of the housing 32, and as shown more clearly in FIGURE 1A, a force-insensitive mount 37 is employed to connect the housing 32 to a sonic conductor or acoustic coupler 38. The mount 37 is a generally cylindrical sleeve having a resonant length of one-half wavelength (or whole number multiples thereof) for the material and geometry of the sleeve at the operating frequency of coupler 38. It further includes an outwardly extending annular flange 39 which engages the lower end of housing 32 and is joined thereto, as by welding, to provide a water-tight and gas-tight seal. One end, preferably the upper end, of the sleeve of mount 37 is free of attachment; and the other end, preferably the lower end, of the same sleeve has an inwardly-directed flange rigidly connected, as by welding, to coupler 38 (preferably at a loop or antinode region thereon) so as to close the space between coupler 38 and mount 37 tightly against leakage of water and/or gas.

The annular flange 39 of mount 37 is located one-quarter wavelength (or an odd multiple thereof when the mount 37 is, as aforesaid, a whole number multiple of one-half wavelength long) distant from the unattached upper end of mount 37, so that a true node will develop at flange 39. The mount 37 is made from suitable low hysteresis material such as steel. For a more detailed description of such a mount, reference is made to United States Patents Nos. 2,891,180 and 2,891,178 entitled "Support for Vibratory Devices" and issued in the name of William C. Elmore.

Acoustic coupler 38 is metallurgically bonded or screw connected to a second acoustic coupler 40, and coupler 40 is metallurgically connected, as by brazing to a vibratory energy transducer or generator 41. Transducer 41, coupler 40, coupler 38, and coupler 35 constitute a vibratory probe generally designated as 60. Coupler or probe end 35 will be described more fully hereinafter.

Housing 32 is vertically movable by means of an elevating mechanism such as rack 42 and pinion 44, thereby adjusting the level of the vibratory probe including probe end 35.

For purposes of centering probe 60 within the housing 32, graphite bushings (not shown) may be and preferably are provided, which are spaced along the exterior of coupler 38 of probe 60 so as to be located at nodal regions thereon while being concentric with and surrounding coupler 38 and being concentric with housing 32 and interposed between the inner surface of housing 32 and the outer surface of coupler 38. It will be appreciated that, for better securement of the graphite bushings, coupler 38 may be provided with indentations in its outer surface for inserting corresponding lateral extensions of the graphite bushings, with due regard for the effect of such indentations on the acoustical (frequency) characteristics of coupler 38 and with due compensation therefor.

The vibratory probe 60, as aforesaid, includes a magnetostrictive transducer 41. The magnetostrictive transducer 41 is of conventional construction comprising a laminated core of nickel, nickel-iron alloy, Permendur (an iron-cobalt alloy), Alfenol (an aluminum-iron alloy) or other magnetostrictive material, properly dimensioned to insure axial resonance with the frequency of the alternating current applied thereto by excitation coil 45 so as to cause it to decrease or increase in length according to its coefficient of magnetostriction. The detailed construction of a suitable magnetostrictive transducer, which in the illustrative embodiment comprises a nickel stack, is well known to those skilled in the art, as above, indicated, does not form a part of the present invention and, accordingly, no description of its construction will be made herein. It will be appreciated by those skilled in the art that in place of the magnetostrictive transducer 41 shown in the drawings, other types of transducers may be substituted; for example, electrostrictive or piezoelectric transducers, made of barium titanate, quartz crystals, etc., may be utilized. Coil 45 is connected to a power supply (not shown) incorporating an oscillator and amplifier suitable for powering the transducer 44; such equipment is well known to the art. The transducer 41 is also provided with a polarizing coil 43, the desirability of magnetically polarizing the transducer 41 by means of polarizing coil 43, in order for the metal laminations in transducer 41 to efficiencly convert the applied energy from excitation coil 45 into elastic vibratory energy, being readily understood by those skilled in the art.

The magnetostrictive transducer 41 is metallurgically bonded in end-to-end contact, as by silver brazing or the like, to a coupler 40. The coupler 40 may be any one of the wide variety of couplers known to the art, and is preferably made of suitable material such as steel, aluminum, bronze, or Monel. In the embodiment shown in FIGURE 1, coupler 40 is of conventional contoured construction for purposes of increasing amplitude of vibration. Preferably, although not shown in FIGURE 1 for lack of space, there is between transducer 41 and coupler 40 another acoustical coupler in the form of a cylindrical bar one or more one-half wavelengths long which is brazed at one end to transducer 41 and brazed or screw-connected at its other end to the tapered portion shown in FIGURE 1 as coupler 40. The tapered coupler portion may be shaped so as to have a taper that is an exponential function of its length and satisfies the following equation:

$$S = S_0 e^{-2Tl}$$

where S is the reduced area at any section of the tapered coupler 40, $S_0$ is the area of the cylindrical portion above mentioned, T is a constant describing the taper, and $l$ is the length of the tapered coupler. This equation and the boundary conditions for resonance of a coupler such as coupler 40 are set forth at page 163 of Piezoelectric Crystals and Ultrasonics by Warren P. Mason, published in 1950 by D. Van Nostrand Company.

Tapered coupler 40 is metallurgically bonded or screw-connected to acoustical coupler bar 38.

The coupler 38 is preferably a resonant length of metal; by this is meant that element 38 will preferably have a length equal to a whole number multiple of one-half wavelengths, or an even number of one-quarter wavelengths, in the material of which the rod is made at the frequency of operation. The combined length of transducer 41, coupler 40, and coupler 38 preferably is dimensioned so that a loop or antinode area of the vibratory energy is juxtaposed to the acoustical tip or probe end 35. Probe end 35 is metallurgically bonded as by welding to coupler 38.

Choice of material for coupler 38 and probe end 35, and also the choice of a joining method for joining the components of probe 60 may be restricted by environmental requirements (such as nuclear requirements on a nuclear application) in addition to acoustical requirements, stainless steel being an acceptable material for couplers and probe ends in addition to a no-flux joining method (such as heliarc welds) for a nuclear application.

Probe 60 includes probe end 35 in the form of a thin rectangular plate dimensioned to vibrate and vibrating in a flexural mode at the resonant frequency of the other components of probe 60.

It will be appreciated that the other resonant geometries may be used as probe end 35, although with some sacrifice in sensitivity. For example, a probe end 35 in the form of a circular plate, designed to vibrate resonantly as a free disk with a single nodal circle (see FIGURE 7A of United States Patent 3,017,792 entitled "Vibratory Device" by William C. Elmore et al.), had about one-third the sensitivity of the thin rectangular plate above described.

Preferably, for support purposes and to minimize frequency shift of the vibratory apparatus and loss of vibratory energy to the associated housing 32 and supporting members, and also for hermetic sealing purposes, a force-insensitive mount 37 is, as aforesaid, attached to coupler 38.

In co-pending patent application Serial No. 66,642 filed November 1, 1960, for "Method and Apparatus for Measurement of Acoustic Power Transmission and Impedance" by Dennison Bancroft et al., the disclosure of which is incorporated herein by reference, there is shown a sensitive apparatus and method for directly determining acoustical energy transmitted in an acoustic transmission line, utilizing standing wave ratio techniques. Such a system is contemplated by the present invention.

In this regard, two vibration sensing elements 78 and 80 are here shown placed on coupler 38. These sensing elements could be small electromechanical transducers, such as a barium titanate wafer, attached at suitable intervals one-quarter wavelength apart. Each of these will produce an alternating electrical signal proportional to the alternating mechanical radial displacement (maximum at a node, minimum at an anti-node) of a particle at the point of attachment. These elements are acceleration sensitive and the mechanical acceleration is 180 degrees out of phase with the displacement.

Inasmuch as these sensing elements are damaged if heated to above about 60° C., cooling provision (such as circulating cooling water through the section of the acoustic coupler to which they are attached) must be made, for efficient operation, in applications likely to result in overheating.

Cooling of the transducers (as by dry oil-free air) is advisable, for efficient operation, to dissipate heat generated by passage of electric current through the transducer windings.

Electronic read-out instruments 83, which may be located remotely, are attached to sensing elements 78 and 80 by electrical cables 82 and 84.

In accordance with the present invention, a vibratory probe having two ends is installed so as to have one of its ends located in the fluid-containing area. Comparative measurements of power transmitted along the probe into the fluid medium, obtained by a standing-wave-ratio technique, provide indications of whether the transmitting end 35 of the proble 60 is located in a vapor phase, in a foam phase, or in a liquid phase, and can also provide indication of the liquid content of the foam phase.

More or less vibratory energy will be transmitted along the coupler, according to the acoustic impedance mismatch between the proble end 35 and the fluid contacted by the proble. The impedance match between the probe end and a liquid is better, for example, than the impedance match between the probe and a gas such as air or steam; therefore, more power will be transmitted along the probe into the liquid than will be transmitted along the probe into the gas. Foam has a relatively intermediate impedance match with concomitants effects on acoustic power transmission. The present invention is also sufficiently sensitive to enable distinction between foams of various liquid content, as well as between certain kinds of liquids.

The change in acoustic power transmitted along the probe into the medium results in a change in the standing wave structure in the probe, and this change is detected by the sensing elements 78 and 80. The read-out instruments 83 translate the output electrical signals from the sensing elements 78 and 80 into a voltage, the value of which is a function of the acoustic impedance match between the probe and the medium in which it is vibrating.

Thus, in a typical embodiment, the output electrical signals from the sensing elements 78 and 80 are used with standard electronic parts, being amplified and fed into a phase-sensitive detector, producing an electrical voltage which is dependent upon the acoustic power being transmitted along the coupler. Changes in transmitted acoustic power can be read directly on a meter, can be continuously recorded from a high-impedance external output circuit, or can be used to activate other remote control devices (not shown). Such a device may be a safety device, for example, for adjusting the level of the liquid in the reactor of FIGURE 1, as necessitated by the aforementioned reactor requirements relating to liquid level in relation to riser location.

Each of the sensing elements 78 and 80 is capable of detecting and transducing to an electrical signal at the system resonant frequency either a stress or a strain in any direction which is proportional to a stress or strain associated with the direction of wave propagation. The especial advantage of having the sensing elements 78 and 80 spaced one-quarter wavelength apart (one at an antinode and one at a neighboring node of the vibration) is the degree of sensitivity thereby provided. Thus the detection of the change (with transmitted acoustic power) not only of the amplitude position of the standing wave at any given time, but also of the phase, when used in conjunction with the amplifying (for the antinode-located sensing element) and phase-sensitive electronic instruments mentioned above, provides an instrumentation apparatus and method of great utility for purposes of the present invention.

By varying the height of the probe and obtaining readings as the result of power transmission changes according to the medium in which the probe is located, interfaces such as a liquid-foam interface and/or foam-gas interface can be located and a composition profile of the fluids within a given vessel can be obtained.

*Examples*

In a typical embodiment of the present invention, the probe 60 was constructed so as to have a nominal resonant frequency of 28,000 cycles per second (actually 29,580 kc.). It was powered by a 25-watt electronic generator operating over the range of 25,000–30,000 cycles per second, in conjunction with a 25-volt D.-C. power supply furnishing 2 amperes of current to the transducer polarizing winding. The power level supplied to the transducer was indicated by an A.-C. voltmeter, the power level input being maintained once the operating conditions of reflected power were set. The barium titanate sensing elements 78 and 80 were fixedly secured to coupler 38 of probe 60 at locations one-quarter wavelength apart remote from probe end 35. The amplifier used in connection with the signals from the element located at an antinode had a voltage gain of 130, and its output was fed to the voltage terminals of a Fluke VAW meter. The signal from the element located at a node was fed directly to the current terminals of the same wattmeter.

In use, the VAW meter was switched to read "current," and the output of the generator was brought to a level giving a full-scale deflection of the VAW meter. The meter was then switched to read "volts," and a convenient scale was selected. When then switched to read "watts," the meter indicated transmitted power in arbitrary units.

For calibration purposes, the probe 60's probe end 35 was positioned in the gas layer of boiling water having a foam layer thereon. The power while in the gas layer was adjusted to give a full-scale reading on the meter in arbitrary units. The probe was lowered so as to be located in the foam, and the transmitted power was recorded. The probe was lowered still further so as to have the probe end covered by the boiling water, and the transmitted power was again noted. A series of these readings was obtained.

The readings obtained showed a distinct change in transmitted power according to the medium in which the probe end was immersed. Sensitivity was also adequate to distinguish between boiling water and still water, when still water was used instead of boiling water; power transmission into still water was better than into boiling water, perhaps because of the voids present in boiling water.

With the embodiment above described, the transmitted power was as follows (with power transmission into steam taken as zero): into foam: 74%; into boiling water: 91%; into still water: 100%. When the embodiment was operated slightly off resonant frequency (at 26.635 kc.), sensitivity was still adequate but somewhat less than the sensitivity at the resonant frequency, with transmitted power as follows: into foam: 61%; into boiling water: 77.5%; into still water: 92.5%.

With a 20 kc. system having a resonant frequency of 20 kc. and a thin rectangular plate probe end 35 (thickness 0.162-inch, length 9.075-inches, width 2.5-inches), used in connection with a different and rather unstable foam, average transmitted power was as follows (also with power transmission to steam taken as zero): into foam: 14%; into boiling water: 32%.

With the same 20 kc. unit, it was possible to distinguish between foams of nine different water concentrations under standardized conditions at room temperature, using power transmission into the air above the foam as a reference level. A change in read-out power of from 9 to 28% on penetration of the air-foam interface was noted, depending upon the particular foam used. The relative sensitivity of the change in delivered power was about 10% per 1 volume percent moisture at the lower moisture levels and about 2% per 1 volume percent moisture at the higher levels.

Although greater sensitivity is obtained by using the power transmission change representing complete immersion of the probe end or coupler plate 35 (indicating that the interface between the two fluids has just been passed), than by using the change induced when only one side of the plate is in contact with the foam, the latter is, however, of sufficient magnitude to be readily detectable by means of the present invention.

The present invention has been successfully operated at boiling water temperatures, and it is particularly suitable for extraordinary environments, (such as high-pressure, high-temperature, and/or high-radiation environments). It can be installed so as to have all complicated parts at one end of the probe (transducer, windings, generating equipment, and appropriate indicating equipment) located outside of such an environment with only the other end of the probe located in the environment.

For purposes of the claims, the sensing probe end 35 can be considered a vibratory energy transmitter or acoustical sensing element.

The present invention may be embodied in other specific forms wtihout departing from the spirit or essential attributes thereof and, accordingly, reference should be made to the appended claims, rather than to the foregoing specification as indicating the scope of the invention.

What is claimed is:

1. Measuring apparatus comprising vibratory energy generating means, said vibratory energy generating means including an elongated ultrasonic coupler, transducer means for ultrasonically energizing said coupler, a probe tip attached to one end of said coupler for transmitting vibratory energy into a fluid medium, said probe tip extending in a transverse direction with respect to said coupler, one surface of said tip being attached to the end of said coupler, said probe tip being adapted to vibrate at the frequency of said ultrasonic coupler, and power sensing means for sensing the power supplied to said probe tip by said transducer means, said power sensing means including transducer means mounted on said coupler, said transducers generating a signal proportional to the ultrasonic power being transmitted through said coupler.

2. Measuring apparatus comprising vibratory energy generating means, said vibratory energy generating means including an elongated ultrasonic coupler, transducer means for ultrasonically energizing said coupler, a probe tip attached to one end of said coupler for transmitting vibratory energy into a fluid medium, said probe tip being a flat plate, one surface of said probe tip being attached to said coupler, said probe tip being adapted to vibrate at the frequency of said ultrasonic coupler, a hollow member, said coupler being located within said hollow member, a force-insensitive mount to mount said coupler to said hollow member, and power sensing means for sensing the power supplied to said probe tip by said transducer means, said power sensing means including at least two transducers mounted on said coupler, said transducers generating a signal proportional to the vibratory power being transmitted through said coupler.

3. The measuring apparatus of claim 1 including mounting means for mounting said probe tip and coupler for upright reciprocal movement with respect to a vessel containing said fluid, and control means for controlling said reciprocal movement to determine the height of fluid in said vessel.

4. The measuring apparatus of claim 1 wherein said probe tip is a thin flat rectangular resonant plate adapted to vibrate in a flexural mode.

References Cited by the Examiner
UNITED STATES PATENTS

| | | | |
|---|---|---|---|
| 1,786,196 | 12/1930 | Ennis | 73—304 X |
| 2,682,026 | 6/1954 | Mesh et al. | 318—31 |
| 2,891,178 | 6/1959 | Elmore | 248—2 |
| 2,973,639 | 3/1961 | Banks | 73—67.1 X |
| 3,100,390 | 8/1963 | Banks | 73—67.1 X |

RICHARD C. QUEISSER, *Primary Examiner.*

DAVID SCHONBERG, *Examiner.*

L. R. FRANKLIN, *Assistant Examiner.*